(12) United States Patent
Tamura et al.

(10) Patent No.: US 7,665,586 B2
(45) Date of Patent: Feb. 23, 2010

(54) CRASH BOX

(75) Inventors: Kenji Tamura, Takatsuki (JP); Yoshiaki Nakazawa, Takarazuka (JP); Michitaka Yoshida, Amagasaki (JP); Katsutoshi Takagi, Aichi (JP); Mitsutoshi Kano, Toyota (JP)

(73) Assignees: Sumitomo Metal Industries, Ltd., Osaka (JP); Toyoda Iron Works Co., Ltd., Aichi (JP)

( * ) Notice: Subject to any disclaimer, the term of this patent is extended or adjusted under 35 U.S.C. 154(b) by 0 days.

(21) Appl. No.: 11/340,664

(22) Filed: Jan. 27, 2006

(65) Prior Publication Data

US 2006/0202511 A1 Sep. 14, 2006

Related U.S. Application Data

(63) Continuation of application No. PCT/JP2004/011110, filed on Jul. 28, 2004.

(30) Foreign Application Priority Data

Jul. 28, 2003 (JP) ............................ 2003-280951

(51) Int. Cl.
*F16F 7/12* (2006.01)
(52) U.S. Cl. ...................... 188/377; 188/371
(58) Field of Classification Search ................ 188/371, 188/376, 377; 296/189.03, 187.05, 187.09, 296/187.12
See application file for complete search history.

(56) References Cited

U.S. PATENT DOCUMENTS 4,190,276 A * 2/1980 Hirano et al. ............... 293/133
4,272,114 A * 6/1981 Hirano et al. ............... 293/133
5,868,457 A * 2/1999 Kitagawa ................ 296/187.09
5,913,565 A * 6/1999 Watanabe .............. 296/187.03
6,068,330 A * 5/2000 Kasuga et al. .......... 296/187.09
6,588,830 B1 * 7/2003 Schmidt et al. ........ 296/187.09

FOREIGN PATENT DOCUMENTS

| JP | 8-26133 | 1/1996 |
|---|---|---|
| JP | 08-108863 | 4/1996 |
| JP | 08-128487 | 5/1996 |
| JP | 09-277953 | 10/1997 |
| JP | 11-208519 | 8/1999 |
| JP | 2002-104107 | 4/2002 |
| JP | 2002-284033 | 10/2002 |
| JP | 2003-048569 | 2/2003 |
| JP | 2003048569 | * 2/2003 |
| JP | 2004-042883 | 2/2004 |
| JP | 2004-106612 | 4/2004 |

* cited by examiner

*Primary Examiner*—Bradley T King
(74) *Attorney, Agent, or Firm*—Clark & Brody

(57) ABSTRACT

A crash energy absorption member is provided which has excellent crash energy absorbing properties with the ability of repeated buckling in a stable manner, a high average load at the time of collapse, and the maximum load which is within a range which does not break other members.

It is a crash energy absorption member which preferably has a transverse cross-sectional shape of an octagon and which is intended for absorbing impact energy by buckling in the lengthwise direction into a shape of bellows when it receives an impact load. With respect to at least one side forming the transverse cross-sectional shape, when the angle formed by the two sides which adjoin the opposing ends of the one side is $\alpha$, the relationship between the length L1 of the one side and the distance L2 between the two furthest ends of the two sides interposing the one side satisfies the following equation:

$$0 < L1/L2 < 1/\{2 \times \sin(\alpha/2) + 1\}.$$

11 Claims, 4 Drawing Sheets

CRASH BOX

CROSS REFERENCES TO RELATED APPLICATIONS

This application is a continuation of International Patent Application No. PCT/JP2004/011110, filed Jul. 28, 2004. This PCT application was not in English as published under PCT Article 21(2).

TECHNICAL FIELD

This invention relates to a crash energy absorption member. Specifically, this invention relates to a crash energy absorption member which can absorb impact energy which is generated at the time of a collision of a vehicle such as an automobile.

BACKGROUND ART

As is well known, at present, the bodies of many automobiles are monocoque bodies in which a load is supported by the overall body which is integral with a frame in order to achieve both a decrease in weight and high stiffness. The body of an automobile must be able to suppress impairment of the functions of the vehicle at the time of a collision of the vehicle and protect the lives of passengers within a passenger cabin. In order to decrease damage to a passenger cabin by absorbing the energy of impact at the time of a collision of a vehicle and reduce the impact force to the passenger cabin, it is advantageous to preferentially crash spaces other than the passenger cabin, such as the engine compartment or the trunk.

On account of such safety demands, crash energy absorption members which actively absorb impact energy by collapsing when an impact load is applied at the time of a collision are provided in suitable locations, such as at the front, the rear, or the side of a vehicle. Examples of such crash energy absorption members are cross side members, side sills, and rear side members.

In recent years, it has been attempted to increase the safety of vehicles and to reduce repair costs by nearly eliminating damage to vehicles caused by light impacts by mounting a crash energy absorption member referred to as a crash box on the front end of a front side member by a suitable means such as coupling with a mechanical connector or welding. A crash box is a member which absorbs impact energy by preferentially buckling in the axial direction into the shape of a bellows (or accordion) under an impact load which is applied in the axial direction.

Various materials and shapes have thus far been developed for increasing the crash energy absorbing performance of such a crash energy absorption member. The crash energy absorbing performance which is demanded of a crash energy absorption member are, specifically, that it deform into a bellows shape by repeatedly stably buckling in the axial direction when an impact load is applied in the axial direction, that the average load be high at the time of collapse of the crash energy absorption member, and that the maximum reaction force which is generated upon the collapse of the crash energy absorption member be within a range which does not cause damage to other members disposed in the vicinity of the crash energy absorption member.

Up to now, crash energy absorption members which have generally been used have been box-shaped members welded to a backing plate by means of a flange provided on a member having a hat-shaped transverse cross-sectional shape like that disclosed in JP-A 08-128487, for example. In this specification, "flange" means an edge portion which projects outwards from an outline of a transverse cross section.

As a different type, in JP-A 09-277953, a crash energy absorption member is disclosed which decreases the load at the initial stage of a collision and increases the absorbed impact by having a closed cross-sectional structure such that the transverse cross-sectional shape continuously changes from one end towards the other end from a polygon having at least 4 sides to a polygon having a larger number of sides.

JP-A 2003-48569 discloses a crash energy absorption member which has a polygonal closed cross-sectional shape with a partition in its interior.

JP-A 2002-284033 discloses a crash energy absorption member which secures strength by forming a recessed portion with a generally right triangle shape facing towards the interior in a region including each of 4 vertices of a material having a rectangular transverse cross section.

In addition, JP-A 08-108 863 discloses an invention which forms a bead which extends in the axial direction on the side surface of a front side frame having a hat-shaped cross section with a flange in order to suppress bending of the front side frame when an impact load is applied.

However, in any of these existing inventions, a crash energy absorption member cannot be provided which can secure a prescribed amount of shock absorption by stable buckling in the axial direction without leading to an increase in weight due to the addition of a partition or an increase in plate thickness.

The transverse cross-sectional shape of crash energy absorption members used in the bodies of automobiles is in almost all cases flat. Therefore, it is difficult to use a crash energy absorption member having a polygonal transverse cross-sectional shape such as a simple regular polygon as disclosed in JP-A 09-277953. In the invention disclosed in JP-A 09-277953, the transverse cross-sectional shape of the crash energy absorption member gradually changes over approximately its entire length. Therefore, in some positions in the axial direction, the transverse cross-sectional shape of the crash energy absorption member may unavoidably become a shape which is not suitable for stable buckling. Accordingly, when an impact load is applied in the axial direction, that crash energy absorption member cannot stably repeatedly buckle in the axial direction, and it may not deform into a bellows shape.

In the invention disclosed in JP-A 2003-48569, there is the possibility of the strength of the portion in which a partition is provided increasing too much. Therefore, in that invention, buckling may become unstable and the amount of shock absorption may become insufficient. There is also the possibility of the maximum reaction force which is generated in the crash energy absorption member, particularly in the initial stage of collapse, exceeding the strength of other members and of the other members collapsing before the crash energy absorption member collapses. In addition, in that invention, the weight of the crash energy absorption member unavoidably increases by an amount corresponding to the partition provided in its interior. Therefore, that invention is contrary to the trend towards decreasing the weight of vehicle bodies, for which there has been a particularly strong desire in recent years.

In the invention disclosed in IP-A 2002-284033, corner portions which inherently have a high strength undergo further working to provide a recessed portion therein. As a result, the strength of the recessed portions may increase too much. Accordingly, in that invention, in the same manner as in the invention disclosed in P-A 2003-48569, the amount of shock absorption may be insufficient, and other members may collapse before the crash energy absorption member collapses.

In the invention disclosed in JP-A 08-108863, a crash energy absorption member has a hat-shaped transverse cross-sectional shape with a flange. According to that invention, it is thought that it is indeed possible to suppress bending due to an impact load applied thereto. However, according to that invention, when an impact load is applied, it cannot stably collapse in the axial direction into a bellows shape.

An object of the present invention is to provide a crash energy absorption member which can secure a prescribed amount of shock absorption by stably buckling in the axial direction into the shape of a bellows when an impact load is applied thereto without an increase in weight due to the addition of a partition or an increase in plate thickness and without causing bending in the axial direction.

DISCLOSURE OF THE INVENTION

This invention is a crash energy absorption member having a tubular body which absorbs impact energy by buckling when an impact load is applied in the axial direction from one end in the axial direction. It is characterized in that the transverse cross-sectional shape in the axial direction of this tubular body is a polygon over the entire length of the tubular body in the axial direction, in that for at least one side making up this polygon, when the angle formed by the two sides which adjoin the one side is $\alpha$, the length of the one side is L1, and the distance between the two ends of the two sides which do not intersect (or adjoin) the one side is L2 then the relationship specified by the following equation is satisfied, and in addition in that of the sides forming the polygon, the one side and another side are disposed in approximately parallel and separated by a distance (L4), and the ratio (L2/L4) of the distance (L2) to the distance (L4) is at least 1.3 and at most 2.0:

$$0 < L1/L2 < 1/\{2 \times \sin(\alpha/2) + 1\}.$$

In a crash energy absorption member according to the present invention, an example is given of the case in which the angle $\alpha$ is at least 97° and at most 150°.

In the crash energy absorption member according to the present invention, an example is given of the case in which the polygon is an octagon.

In a crash energy absorption member according to the present invention, the interior of the tubular body preferably is a single space.

In addition, in a crash energy absorption member according to the present invention, the polygon is preferably a polygon having a constant number of sides.

BEST MODE FOR CARRYING OUT THE INVENTION

Below, embodiments of the present invention along with their operation and effects will be described in detail.

For an arbitrary flat cross-sectional shape actually applied to a crash energy absorption member, there exists a cross-sectional shape of a crash energy absorption member which can secure a level of shock absorption by stably buckling in the axial direction into the shape of a bellows without an increase in weight due to the addition of a partition or an increase in plate thickness.

Namely, as a result of careful consideration making use of FEM numerical analysis, the present inventors made the findings set forth below as items (1)-(3).

Figure 1:
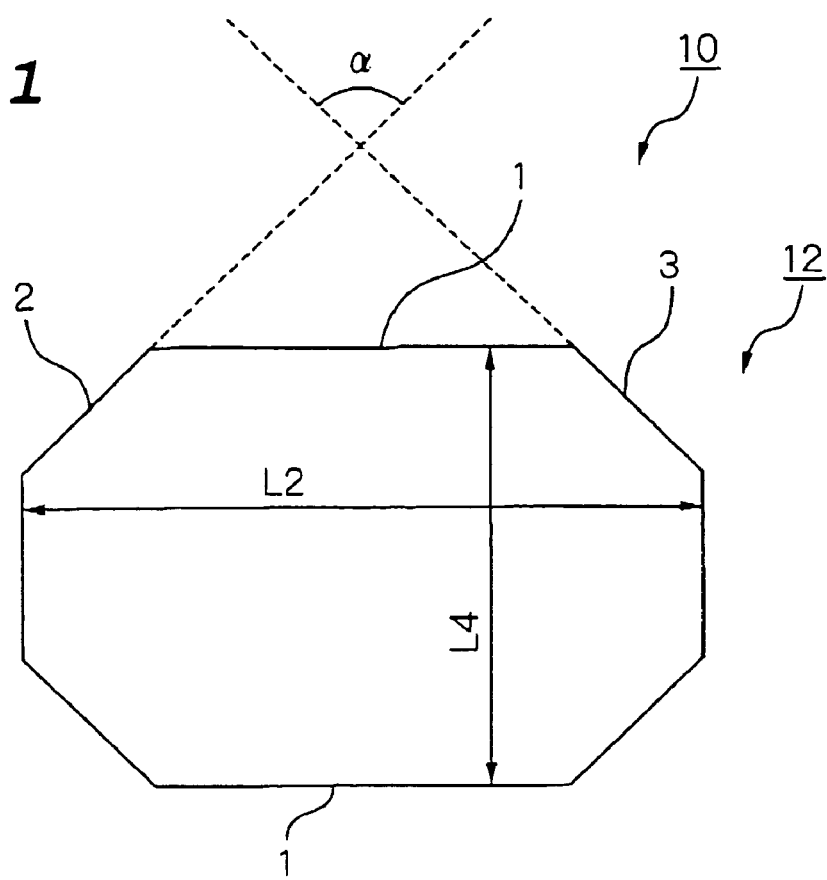
FIG. 1 is a schematic explanatory view of a transverse cross section of a tubular body having a transverse cross-sectional shape comprising a flat octagon.

(1) FIG. 1 is a schematic explanatory view showing a cross section of a crash energy absorption member 10 formed from a tubular body having a transverse cross-sectional shape which is a polygon.

In FIG. 1, if the length of a side 1 of a regular octagon 12 for which angle $\alpha$ is 90° is lengthened to form a flat shape, the greater is the flatness, the more unstable does buckling become. If angle $\alpha$ becomes smaller than 90°, buckling becomes still more unstable. Accordingly, angle $\alpha$ should be larger than 90°.

Here, "buckling is stable" means that collapse occurs by repeated buckling into the shape of a bellows. "Buckling becomes unstable" means that the occurrence of bending or the like in the course of collapse interferes with repeated buckling, and collapse does not take place in the shape of a bellows.

Figure 2:
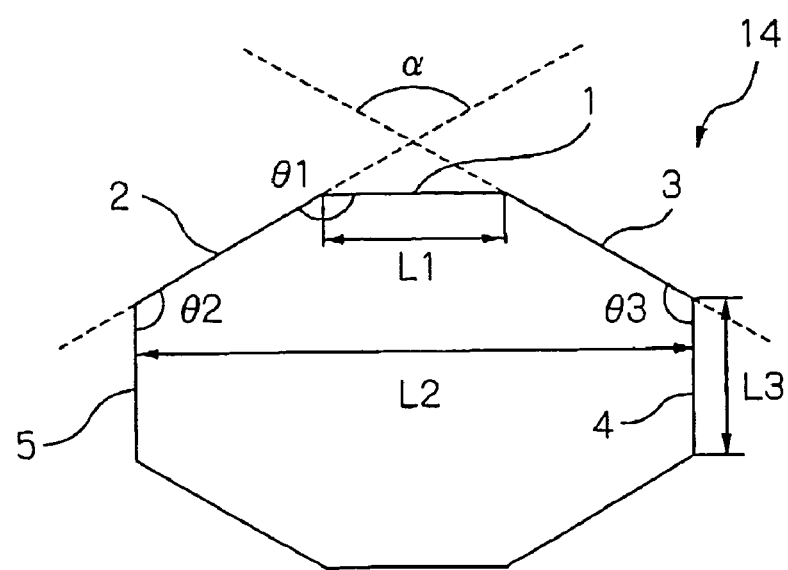
FIG. 2 is a schematic explanatory view of a transverse cross section of a tubular body having a transverse cross-sectional shape comprising a flat octagon.

(2) FIG. 2 is a schematic explanatory view showing a cross section similar to FIG. 1. As shown in FIG. 2, a flat octagon 14 has side 1 adjoined by sides 2 and 3, and as the ends of sides 2 and 3 which intersect side 1 approach each other such that the overall shape of an octagon is transformed to approach a lozenge shape, buckling becomes stable.

(3) If the lengths L1 and L3 of the sides 1 and 4, respectively, in FIG. 2 become 0 to form a lozenge shape, buckling becomes unstable.

Based on these findings (1)-(3), the present inventors performed diligent investigations of the relationship between angle $\alpha$ and lengths L1, L2 using as a reference an octagonal cross-sectional shape with a flatness of 2.0 formed by lengthening two opposing sides of a regular octagon measuring 35 mm on a side and having a sheet thickness of 1.6 mm to increase the length of the two sides to 119.5 mm. "Flatness" specifies the ratio of the lengths of a long side to short side of a rectangle which circumscribes the transverse cross section of a crash energy absorption member. For example, the flatness of the octagon 12 shown in FIG. 1 is calculated as (L2/L4).

Namely, in this investigation, the length of side 1 of the octagon 12 shown in FIG. 1 was shortened, and the angle $\alpha$ between sides 2 and 3 on both sides of one side 1 shown in FIG. 2 and the length of side 1 were varied.

The distance L2 between the ends of sides 2 and 3 which do not intersect side 1 was fixed at 169 mm. In this example, the axial length of a crash energy absorption member was made 200 mm, and the energy absorbed at the time of collapse in the lengthwise direction of the crash energy absorption member 14 when it was collapsed in the axial direction was compared.

Figure 3:
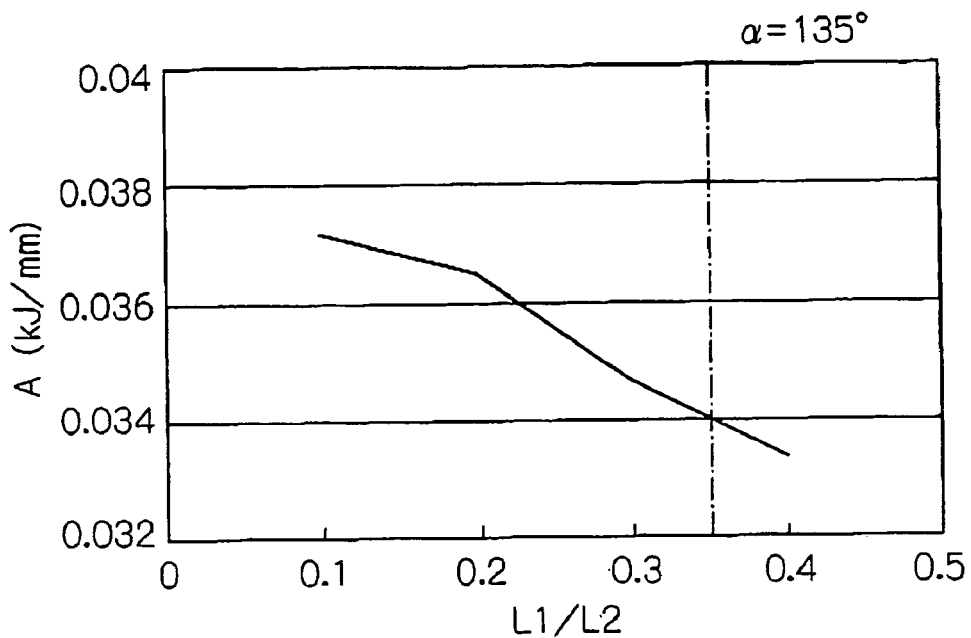
FIG. 3 is a graph showing the criticality of the ratio of L1 to L2 for the case in which the angle $\alpha$ is 135°.
Figure 4:
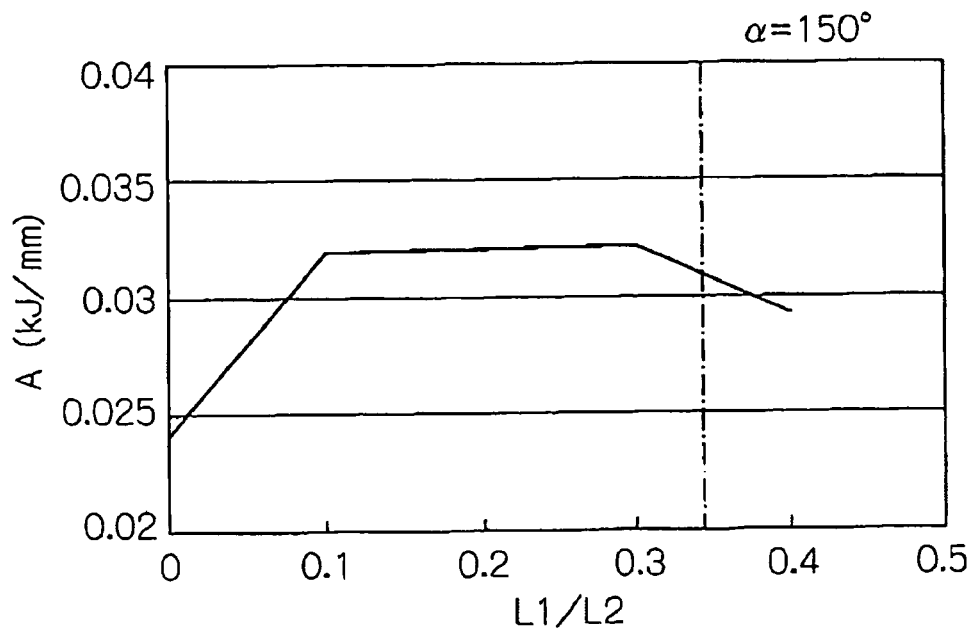
FIG. 4 is a graph showing the criticality of the ratio of L1 to L2 for the case in which the angle $\alpha$ is 150°.

The results are shown in the graphs of FIG. 3 and FIG. 4. The ordinate A in FIGS. 3 and 4 shows the energy absorbed during collapse (kJ/mm) per unit length of circumference when the amount of collapse in the axial direction was 130 mm.

As can be seen from the graphs in FIGS. 3 and 4, when angle α is either 135° or 150°, by making the ratio of L1 to L2 (L1/L2) so as to satisfy the following conditions, a sufficient amount of absorbed energy can be secured.

In the graphs of FIGS. 3 and 4, the value on the abscissa (L1/L2) indicated by the dash and dot line is a value for which the length L1 of side 1 becomes equal to the lengths of sides 2 and 3. By making the value of (L1/L2) smaller than the value shown by the dash and dot line, i.e., by shortening the length L1 of side 1, an amount of absorbed energy can be secured. The reason for this is as explained below.

In general, when a crash energy absorption member having a polygonal transverse cross-sectional shape collapses in the lengthwise direction, the greater is the length of one side, the easier it is for bending to take place when this side buckles, and it displays unstable behavior.

On the other hand, the larger are some of the internal angles formed by this polygon, the more unstable is buckling.

If such unstable buckling occurs, the collapse load of the member markedly decreases compared to the case of stable buckling. As a result, the amount of absorbed energy up to a prescribed amount of collapse decreases.

As shown in FIG. 2, when the transverse cross-sectional shape of a crash energy absorption member is a flat polygon, internal angle θ1 formed by side 1 and side 2 is large compared to internal angle θ2 formed by side 2 and side 5 and internal angle θ3 formed by side 3 and side 4.

Accordingly, side 2 and side 3 are more stable with respect to buckling than is side 1. In other words, in order to secure buckling stability of the crash energy absorption member as a whole by increasing the buckling stability of side 1 to the same level as the buckling stability of side's 2 and 3, as supported by the results shown in the graphs of FIGS. 3 and 4, it is preferable for the length of side 1 to be smaller than the lengths of sides 2 and 3.

Using L1 and L2 and angle α, this relationship is expressed by $0 < L1/L2 < 1/\{2 \times \sin(\alpha/2) + 1\}$.

The flatness of crash energy absorption members which are actually used varies with the component. In order to elucidate a suitable lower limit for angle α, the influence of angle α on the stability of buckling of a crash energy absorption member having a relatively low flatness of 1.3 was investigated by varying angle α in a range of 95° and above. In this study, L2 was made 169 mm and L1 was made 50.7 mm, which satisfied the relationship prescribed by the above-described equation for any value of angle α. At this time, the value of (L1/L2) was 0.3.

Figure 5:
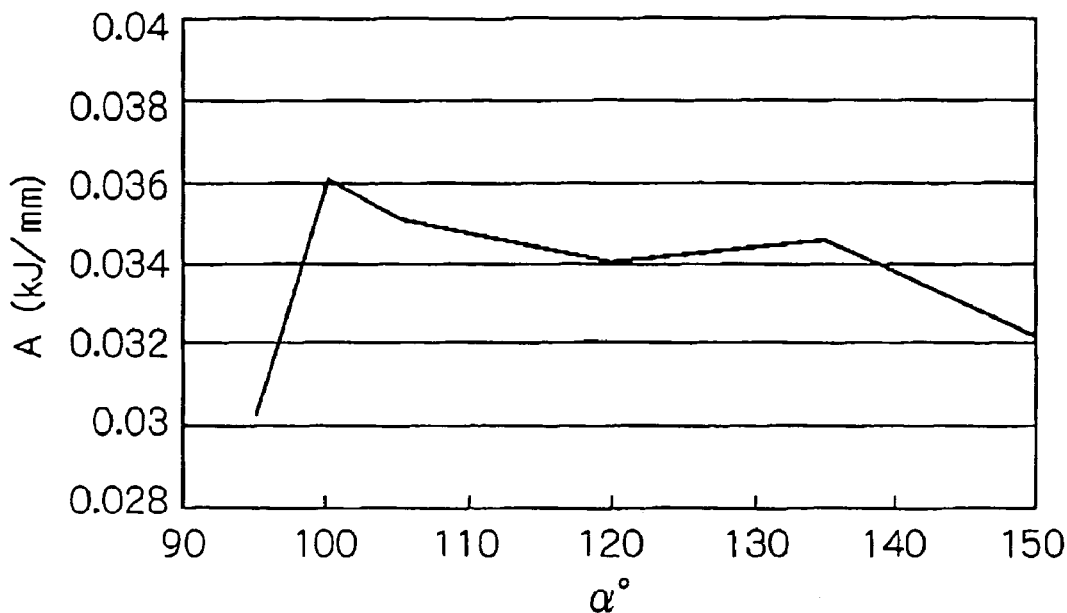
FIG. 5 is a graph showing the criticality of the angle $\alpha$.

The results are shown in the graph of FIG. 5. In the same manner as for the ordinate A in FIGS. 3 and 4, the ordinate A in FIG. 5 shows the energy absorbed in collapse (kJ/mm) per unit length of circumference when the amount of collapse was 130 mm.

As shown in the graph of FIG. 5, if angle α is smaller than 100°, the absorbed energy rapidly begins to decrease, and particularly when it becomes less than 97°, the absorbed energy becomes extremely low, and there is no longer any practicality. This is because if angle α becomes smaller than 97°, the ridge lines at both ends of side 1 in FIG. 2 exhibit bending behavior, and buckling becomes unstable.

In this manner, by having angle α be in the range of at least 97° and at most 150°, a high level of absorbed energy is obtained. More preferably, angle α is at least 100° and at most 140°. As a result, a high level of absorbed energy can be stably secured.

Even in cases in which angle α is in the range of at least 97° and at most 150°, when the ratio (L1/L2) is larger than the value satisfying the above-described range, the strength of side 1 decreases, and large bending develops at the time of buckling.

The ratio (L1/L2) is preferably at least 20% of $1/\{2 \times \sin(\alpha/2) + 1\}$, and more preferably it is at least 50% of $1/\{2 \times \sin(\alpha/2) + 1\}$.

According to the present invention, the buckling of a crash energy absorption member having a transverse cross-sectional shape with an even larger flatness can be stabilized, Namely, the relationship $[0 < L1/L2 < 1/\{2 \times \sin(\alpha/2) + 1\}]$ between the angle α between sides 2 and 3 on opposite sides of side 1 and lengths L1 and L2 which was described above while referring to FIGS. 1-5 is not applicable only to a crash energy absorption member having an octagonal transverse cross-sectional shape as shown in FIGS. 1-5. It is also applicable to a crash energy absorption member having a transverse cross-sectional shape which is a polygon other than an octagon and which has an arbitrary flatness.

Figure 6:
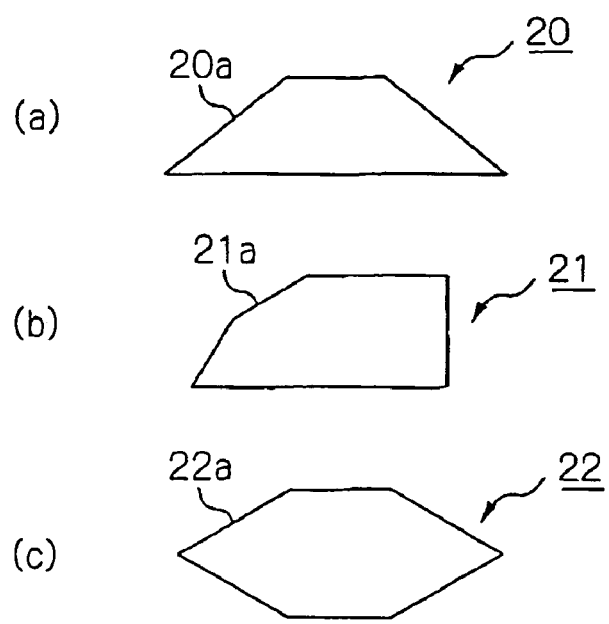
FIGS. 6(a)-6(c) are explanatory views showing examples of typical transverse cross-sectional shapes of a crash energy absorption member having a transverse cross-sectional shape which is a polygon other than an octagon.

FIG. 6(a), FIG. 6(b), and FIG. 6(c) are explanatory views showing examples of typical transverse cross-sectional shapes of crash energy absorption members 20-22 having a transverse cross-sectional shape which is a polygon other than an octagon.

FIG. 6(a) shows the case of a quadrangle 20a, FIG. 6(b) shows the case of a pentagon 21a, and FIG. 6(c) shows the case of a hexagon 22a.

When a crash energy absorption member is installed as a component of a vehicle body, due to restrictions on installation space such as the installation space for the engine compartment, there are cases in which the transverse cross-sectional shape of a crash energy absorption member must be a non-symmetric shape such as that shown in FIG. 6(b). The effects of the present invention are particularly prominent in such a case.

A crash energy absorption member is usually installed in two locations which are symmetrical with respect to the widthwise direction of a vehicle body. Therefore, the transverse cross-sectional shapes of these two crash energy absorption members are preferably the same, However, in the case of an offset impact, the magnitudes of the impact forces acting on each of the two crash energy absorption members greatly differ, so taking into consideration the mode of impact, it is possible for the transverse cross-sectional shapes of these two crash energy absorption members to be different shapes.

Thus, with a crash energy absorption member having a transverse cross-sectional shape comprising a polygon with a flatness of 2.0, for example, when, the length L1 of side 1 in FIG. 2 is made 0, buckling becomes unstable during collapse, so impact energy cannot be sufficiently absorbed at the time of impact.

In contrast, according to the present invention, by the presence of side 1 in FIG. 2, buckling becomes stable, and it is easy to secure the absorption of energy. However, if the ratio (L1/L2) is set too high, it is easy for large bending deformation to occur at the time of buckling. Accordingly, by setting the ratio (L1/L2) to be in a prescribed range, stable buckling can be realized. By setting angle α to be within the above-described range, buckling is further stabilized.

A crash energy absorption member according to the present invention preferably does not have a flange which projects outwards from the outline of its transverse cross section. If a flange is provided, during collapse in the axial direction, the flange provides resistance against axial collapse deformation and functions as a sort of strut, and there are cases in which it causes bending of the crash energy absorption member in the lengthwise direction during collapse. Therefore, if a crash energy absorption member has a flange, the amount of absorbed energy at the time of impact greatly decreases compared to the case in which it does not have a flange.

A crash energy absorption member according to the present invention may be manufactured by any method, and there are no particular restrictions on the manufacturing method. For example, it may be manufactured by extrusion, or a steel sheet having a prescribed thickness may be used as a blank, and it may be formed into a member for forming a tubular body having a polygonal transverse cross-sectional shape by press working, and the opposing ends of this member may be joined to each other by a suitable means such as welding.

The crash energy absorption member according to the present invention is formed from a tubular body having a closed cross section.

As described above, according to the present invention, a crash energy absorption member can be provided which can secure a prescribed amount of shock absorption by stably buckling in the axial direction into the shape of a bellows when an impact load is applied thereto without an increase in weight due to the addition of a partition or an increase in plate thickness and without causing bending in the axial direction.

EXAMPLES

The present invention will be explained in detail while referring to examples.

The below-described impact test was carried out in order to verify the effects of the present invention.

A high tensile strength steel sheet with a strength on the order of 590 MPa and a sheet thickness of 1.6 mm was used as a material for forming a crash energy absorption member according to the present invention. This material was subjected to press forming and welding to prepare a crash energy absorption member having a tubular body with a hexagonal or octagonal transverse cross-sectional shape and a length of 200 mm.

This crash energy absorption member was vertically disposed, and then a weight which weighed 200 kgf was dropped in free fall from a height of 11.9 m so that it impacted with the crash energy absorption member in the axial direction at a speed of 55 km/hr. The absorbed energy was compared when the amount of collapse in the axial direction was 130 mm. The test results are compiled in Table 1.

TABLE 1

| Example No. | Shape | Flatness | L1/L2 | Angle α (°) | $1/(2 \times \sin(\alpha/2) + 1)$ | Energy absorbed in collapse to 130 mm per unit length of circumference (kJ) | State of collapse |
|---|---|---|---|---|---|---|---|
| 1 | octagon | 2.0 | 0.30 | 135.0 | 0.35 | 0.0345 | stable buckling |
| 2 | hexagon | 2.0 | 0.00 | 147.5 | 0.34 | 0.0234 | large bending |
| 3 | octagon | 2.0 | 0.40 | 150.0 | 0.34 | 0.0265 | large bending |
| 4 | hexagon | 2.0 | 0.35 | 104.9 | 0.39 | 0.0359 | stable buckling |
| 5 | octagon | 1.3 | 0.35 | 120.0 | 0.37 | 0.0335 | stable buckling |
| 6 | octagon | 1.3 | 0.35 | 95.0 | 0.40 | 0.0297 | bending |
| 7 | octagon | 2.0 | 0.71 | 90.0 | 0.41 | 0.0288 | large bending |

In Examples Nos. 1-4 of Table 1, the flatness was 2.0, and L2 shown in FIG. 2 was made 169 mm.

In particular, in Example No. 1, the ratio (L1/L2) was made 0.3 and angle α was made 135°.

In Example No. 2, the ratio (L1/L2) was made 0 to form a hexagonal transverse cross section, and angle α was made 147.5°.

In Example No. 3, angle α was made 150° and the ratio (L1/L2) was made 0.4, which was larger than 1/[2×sin(150°/2)+1].

Figure 7:
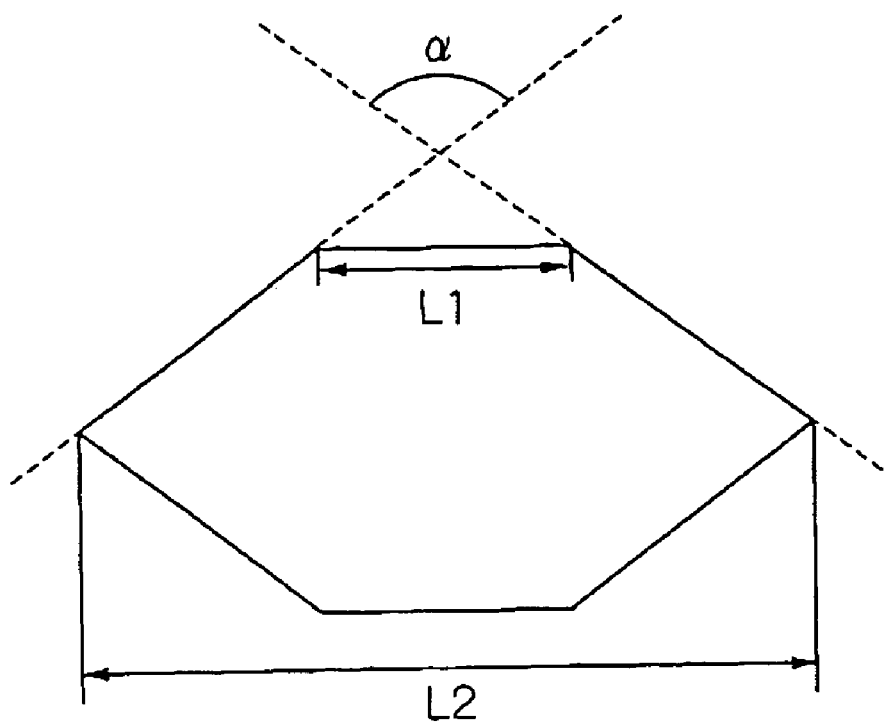
FIG. 7 is a schematic explanatory view of the transverse cross-sectional shape of a crash energy absorption member in an example.

In Example No. 4, the hexagonal transverse cross-sectional shape shown in FIG. 7 was used, the ratio (L1/L2) was made 0.35, and uncle α was made 104.9°.

In Example No. 5 and Example No. 6, the flatness was made 1.3, and L2 was made 169 mm.

In Example No. 5, the ratio (L1/L2) was made 0.35, and angle α was made 120°.

In Example No. 6, the ratio (L1/L2) was made 0.35 as in Example No. 5, and angle α was made 95°.

In Example No. 7, starting with a regular octagon having a side length of 35 mm, the lengths of two opposing sides 1, 1 shown in FIG. 1 were increased to 119.5 mm to obtain a flatness of 2.0.

As shown in Table 1, by employing a suitable range for the relationship between the ratio (L1/L2) and angle α, it is possible to stably secure a high level of absorbed energy with a crash energy absorption member having a flat polygonal cross-sectional shape.

INDUSTRIAL APPLICABILITY

According to the present invention, a crash energy absorption member can be provided which can secure a prescribed amount of shock absorption by stably buckling in the axial direction into the shape of a bellows when an impact load is applied without an increase in weight due to the addition of a partition or an increase in plate thickness and without leading to bending in the axial direction.

As a result, even in the case in which the crash energy absorption member has a high flatness, buckling is stable at the time of crash energy absorbing and a sufficient amount of shock absorption can be fully secured.

The invention claimed is:

1. A crash box having a tubular body having a flat cross sectional shape with a flatness of at least 1.3 and at most 2.0, characterized in that over the entire length of the tubular body in the axial direction, the transverse cross-sectional shape in the axial direction of the tubular body is a polygon, for at least a first side forming the polygon, when the angle formed by second and third sides which adjoin the first side is $\alpha$, the relationship between the length ($L1$) of the first side and the distance ($L2$) between two ends of the second and third sides which do not intersect the first side satisfies the following equation (1), $$0 < L1/L2 < 1/\{2 \times \sin(\alpha/2) + 1\} \quad (1)$$

wherein the equation means that the length $L1$ is less than a length of either of the second and third sides, the angle $\alpha$ is at least 100° and at most 140°, and the flatness is defined by the ratio ($L2/L4$) of the distance ($L2$) to the distance ($L4$)

wherein the distance ($L2$) is as defined above and the distance ($L4$) is a distance between the first side and a fourth side which form the polygon and which are approximately parallel and separated by a distance ($L4$), wherein, when an impact is applied in the axial direction from one end of the tubular body in the axial direction, the tubular body, by virtue of the transverse cross-sectional shape and satisfying the equation relating to the first, second and third sides, absorbs the impact energy by the sides of the tubular body buckling in a uniform fashion along the length of the tubular body.

2. The crash box as set forth in claim 1, wherein the polygon is an octagon.

3. The crash box as set forth in claim 1, wherein the interior of the tubular body is a single space.

4. The crash box as set forth in claim 1, wherein the polygon is a polygon having a constant number of sides.

5. The crash box as set forth in claim 2, wherein the interior of the tubular body is a single space.

6. The crash box as set forth in claim 2, wherein the polygon is a polygon having a constant number of sides.

7. The crash box as set forth in claim 3, wherein the polygon is a polygon having a constant number of sides.

8. The crash box as set forth in claim 5, wherein the polygon is a polygon having a constant number of sides.

9. The crash box as set forth in claim 4, wherein the crash box is made of a steel plate.

10. In a combination of a side member and a crash box, wherein the crash box is arranged on a front end of the side member to absorb impact energy prior to the side member absorbing impact energy, the improvement comprising the crash box of claim 1 being arranged on the front end of the side member.

11. The crash box as set forth in claim 1, wherein the tubular body is made of a steel plate.

* * * * *